Nov. 18, 1958 C. PALUCK 2,860,794
TRACTOR LOADER ATTACHMENT
Filed Sept. 5, 1956 2 Sheets-Sheet 2
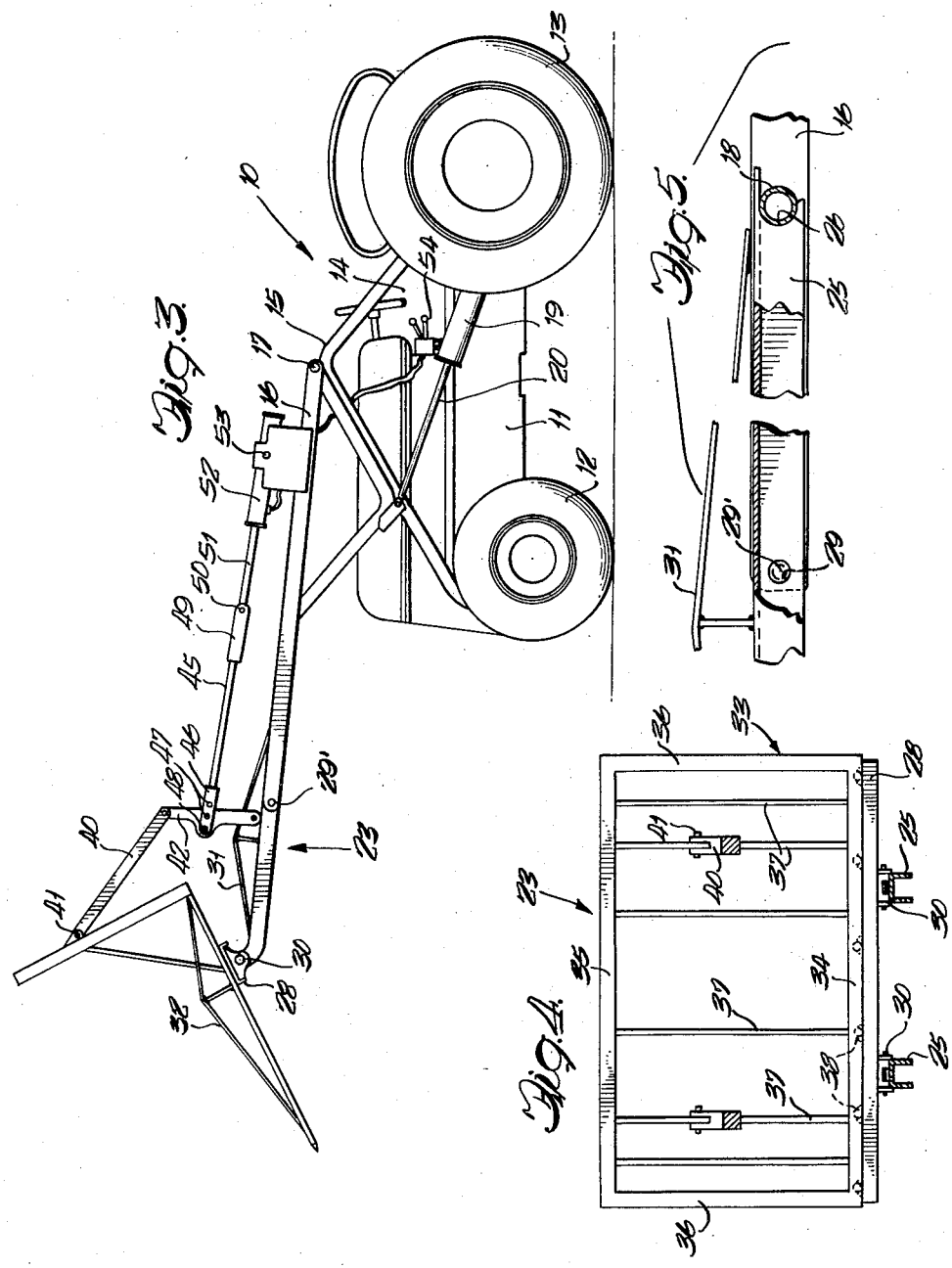
Inventor
Casmir Paluck
by Hilmond O. Vogel
Attorney

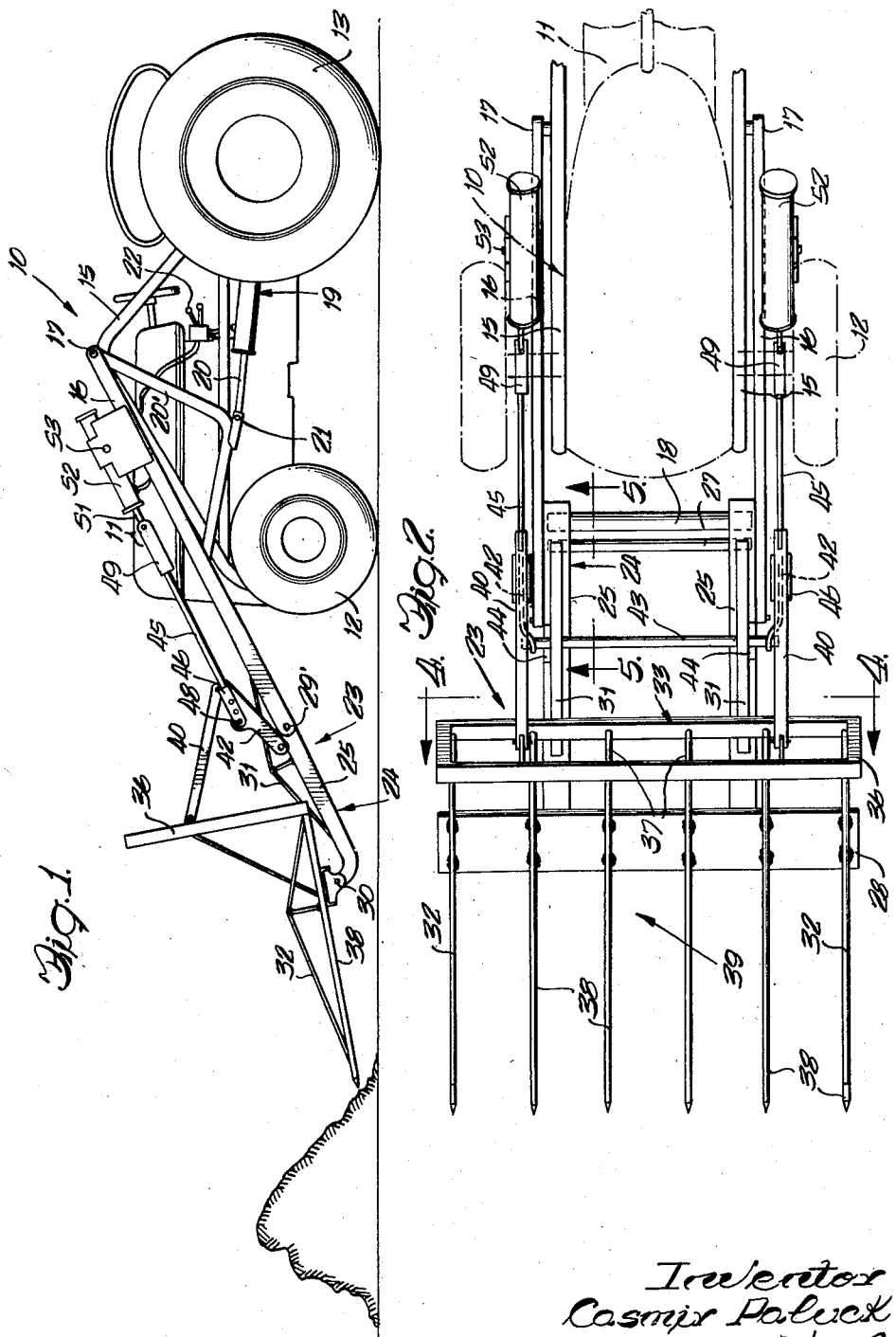

United States Patent Office 2,860,794
Patented Nov. 18, 1958

2,860,794

TRACTOR LOADER ATTACHMENT

Casmir Paluck, Belfield, N. Dak.

Application September 5, 1956, Serial No. 608,139

2 Claims. (Cl. 214—140)

This invention relates to a tractor loader attachment and more particularly it relates to a loader of the fork lift type having an improved construction particularly adapted for quick attachment and detachment to the loader frame normally mounted on a tractor vehicle.

It is a particular and primary object of this invention to provide an improved loader atachment, such as a forage fork which can be easily attached and detached with respect to the conventional loader construction found in existing conventional tractors.

Tractor loaders, which are mounted on a tractor generally comprise laterally spaced and longitudinally extending lift arms which may be suitably raised and lowered by means of hydraulic equipment mounted on the tractor. The lift arms generally have connected at one end a suitable bucket or scoop shovel adapted for loading of various types of farm materials. It is a prime object of this invention to provide an improved forage fork particularly adapted to the lifting structure of a typical bucket type loader, the said forage fork having provisions whereby it may be easily attached to the ends of the lifting arms which normally support the bucket arrangement.

A still further object is to provide an improved forage fork particularly adapted for loading and unloading farm type produce, the said forage fork being adapted for connection to the loader attachment of a tractor and including an improvement whereby the forage fork may be tilted to any desired angle during the operation of the same.

A still further object is to provide an improved loader attachment for tractors and especially a forage fork, having an improved construction and improved reinforcement whereby a strong and efficient structure is provided.

A further object is to provide an improved forage fork attachment for tractors having provisions for attaching the same to the lifting arrangement of a tractor loader, the said forage fork having increased height during lifting operations whereby the lifting of loads to great heights is greatly facilitated.

A still further object is the provision of an improved forage fork attachment for tractor loaders which are normally mounted on small tractors, the forage fork permitting the platform or basket to be raised to increased heights by virtue of the novel arrangement of the structure and parts thereof.

A further object is to provide an improved quickly attachable forage fork for existing loader constructions, the said forks being particularly adaptable to said constructions whereby the fork may be quickly and easily attached or detached from the existing structure.

These and further objects will become more readily apparent from a reading of the specification when examined in connection with the accompanying sheets of drawings.

In the drawings:

Figure 1 is a side elevational view of a tractor and loader attachment showing an improved forage fork attachment connected thereto;

Figure 2 is an enlarged plan view of a forage fork attachment attached to the existing loader structure of a tractor, the tractor being schematically shown;

Figure 3 is a side elevational view similar to Figure 1 showing a forage fork and a tractor loader attachment in a raised position also indicating the manner of adjustment of a lifting platform or forage fork basket;

Figure 4 is a cross-sectional view through a portion of a forage fork, the said view being taken particularly along the line 4—4 of Figure 2, and Figure 5 is an enlarged cross-sectional view of an attaching means for a forage fork taken substantially along the line 5—5 of Figure 2.

Referring now particularly to Figures 1, 2 and 3 a conventional type tractor is generally designated by the reference character 10.

The tractor 10 comprises a tractor body 11 having forward ground wheels 12 and rear ground wheels 13. The tractor 10 is provided with an operator's station 14.

A lifting frame is generally designated by the reference character 15 and the frame 15 comprises essentially a pair of laterally spaced lifting arms 16 which are suitably pivoted on the tractor body 11 as indicated by the reference character 17. The lifting arms 16 are also suitably connected by a cross brace 18. Fluid extensible devices 19 are suitably pivoted on opposite sides of the body (not shown), the said fluid extensible devices 19 including piston arms 20 which are pivotally connected to tubular V members 20', as indicated at 21, the said tubular V members 20' being suitably in turn connected to the lifting arms 16.

The fluid extensible devices 19 are suitably connected to a valve arrangement 22 which regulates the fluid supply to the extensible devices 19 for effectuating lifting and lowering of the arms 16.

A tractor loader attachment for forage fork attachment is generally indicated by the reference character 23. The loader attachment 23 comprises essentially a frame 24 having laterally spaced and longitudinally extending substantially parallel frame members 25. As particularly indicated in Figure 5 the ends of the frame members 25 are provided with slots 26 which are adapted to engage the cross bar 18 connected to the lifting arm 16. The frame 24 is also suitably reinforced by a cross brace beam 27 at its rearmost end and a channel beam member 28 extends transversely at the forward ends of the frame members 25. The frame members 25 are also provided with openings 29 which as indicated in Figure 5 may be engaged by suitable securing means such as pins, bolts, etc., 29' also extending through the front portions of the arms 16.

The said pins 29' also may be utilized as pivot means for normally pivotally mounting the shovel or scoop of a typical tractor loader, which in the case of use of the forage fork is, of course, removed. However, the same pivot pins 29' may be utilized and it is thus apparent that the forage fork attachment may be easily attached to the same attaching means which normally is used for the scoop arrangement.

The channel 28 as particularly shown in Figure 4 is also suitably connected by pivot means 30 to the frame members 25.

A back support 33, generally designated, comprises lower and upper cross members 34 and 35 respectively which are suitably connected by end vertical members 36. Thus a rectangular frame is formed and this frame is further reinforced by upright bars 37 which are connected to the cross members 34 and 35. As best indicated in Figure 2 a plurality of tines 38 are rigidly secured to the cross member 28 by welding or other suitable means, the tines 38 also being connected at their rear ends to the lower cross member 34. The members 33 through 38 form in effect a fork or loader assembly which is generally designated at 39, it of course being understood that this construction may vary and a different type of fork construction can be used.

The fork 39 is pivotally mounted so that it may be tilted at various angles and this is accomplished by a pair of laterally spaced links 40 suitably connected at 41 in a pivotal maner. A pair of links 42 in turn is connected to the links 40, the said links 42 being rigidly connected to a tubular member 43 extending across the frame members 25 and being pivotally mounted thereon by means of brackets 44.

A pair of laterally spaced push pull members 45 are provided at their forward ends with parallel spaced strap members 46 having a plurality of aligned openings 47, the said strap members 46 being pivotally connected as indicated by shaft 48 to the links 42. The openings 46 permit adjustment of the strap members 46 with respect to the links 42. The rear ends of the push pull members 45 are also provided with attaching members 49 which are as indicated at 50 pivotally connected to piston arms 51 extending outwardly from cylinders 52 which are connected to the lifting arms 16. The cylinders 52 are attached for pivotal movement on the lifting arms as indicated at 53. The cylinders 52 are also suitably connected by suitable flexible conduit arrangements to a valve lever arrangement 54 adapted to be connected to a source of fluid pressure (not shown).

The frame members 25 are suitably reinforced by reinforcing rods 31 and the end tines 38 are suitably reinforced by reinforcing rods 32. Thus the forage fork or loader assembly is rigidly reinforced and a strong construction is maintained.

As indicated from Figure 5 the arms 25 may be quickly attached to the tubular cross-member 18 by simply placing the said arms with the recesses 26 partially encircling the said cross-member 18. The tractor attachment shovel normally positioned on the frame members 16 is, of course, removed and the pins 29' are replaced through the openings 29 of the frame members 25 thus securely locking the complete load forage fork or loader assembly to the existing loader structure mounted on the tractor.

Tilting movement of the fork is easily accomplished by means of the push pull arms 45 which are actuated by the cylinders 52. Thus the operator can raise and lower the assembly and by simply actuating the lever or valve 54 tilting to any desired degree as provided.

It is readily apparent by the extension of the arms 25 increased height is provided and thus hay bales, hay, and other farm produce may be easily raised to the desired height for effectuating loading of the same either onto barn platforms, silos, or trucks. The assembly is particularly strong and yet a sufficient light construction is provided which can easily be attached to the existing loader structure of conventional tractors.

Thus the objects of the invention have been fully achieved and it must now be realized that changes and modifications may be made which do not depart from the spirit of the invention as disclosed or the scope thereof as defined in the appended claims.

What is claimed is:

1. For a tractor having a forwardly extending generally extending U-shaped lifting frame pivotally mounted on the tractor, said frame including laterally spaced arms having connecting elements at the forward ends thereof, a laterally extending connecting member longitudinally spaced from said forward ends and connected to said arms, and power operated means for raising and lowering said arms; a tractor loader attachment comprising laterally spaced frame members, laterally extending and longitudinally spaced beams connecting said frame members, each of said frame members having at one free end a recess positioned for releasable engagement by said laterally extending connecting member, each of said frame members and arms having an opening longitudinally spaced from said recesses, said openings being in registrable alinement, removable connecting elements adapted for connective reception into said openings whereby said frame members are detachably supported on said lifting frame, a tiltable loader assembly comprising a transversely extending member pivotally connected to said frame members, laterally spaced tines supported on said transversely extending member, a back support connected to said tines, said back support comprising a plurality of interconnected members extending in relatively right angle relation to said tines, means for tilting said loader assembly about a transverse axis comprising a shaft extending transversely and being pivotally connected to said frame members, first links connected to said shaft for movement therewith, second links pivotally connected to said first links and pivotally connected to said back support, and a push-pull member pivotally connected at its forward end to one of said first links and its rearward end being releasably connected to extensible power actuating means mounted on said lifting frame for controlably tilting said loader assembly, said loader attachment being moveable in substantially a vertical direction responsive to movement of said lifting frame.

2. For a tractor having a forwardly extending generally U-shaped lifting frame pivotally mounted on the tractor, said frame including laterally spaced arms having connecting elements at the forward ends thereof, a laterally extending connecting member longitudinally spaced from said forward ends and connected to said arms, and means for raising and lowering said arms; a tractor loader attachment comprising laterally spaced frame members, each of said frame members having at its rearward end a recess positioned for releasable engagement by said laterally extending connecting member, each of said frame members and arms having connecting means longitudinally spaced and in registrable relation from said recesses, said connecting means being releasably engaged by connecting elements whereby said frame members are releasably supported on said lifting frame, a tiltable loader assembly comprising a transversely extending member pivotally connected to said frame members, a fork on said transversely extending member, a back support connected to said fork, said back support comprising a plurality of interconnected members extending in relatively right angle relation to said fork means for tilting said loader assembly about a transverse axis comprising a shaft extending transversely and being pivotally connected to said frame members, first links connected to said shaft for movement therewith, second links pivotally connected to said first links and pivotally connected to said back support, and a push-pull member releasably connected at its forward end to one of said first links and connected at its rearward end to power actuating means on said lifting frame for adjusting the tilt of said loader assembly, said loader attachment being moveable in response to movement of said lifting frame.

References Cited in the file of this patent

UNITED STATES PATENTS

| | | |
|---|---|---|
| 2,288,496 | Swedberg | June 30, 1942 |
| 2,305,119 | Walker | Dec. 15, 1942 |
| 2,495,143 | Simmonds | Jan. 17, 1950 |
| 2,685,973 | Dobeus | Aug. 10, 1954 |
| 2,745,564 | Billenstein | May 15, 1956 |
| 2,812,082 | Meldahl | Nov. 5, 1957 |